United States Patent [19]

Ruf

[11] Patent Number: 4,847,121
[45] Date of Patent: Jul. 11, 1989

[54] MODIFIED POLYETHYLENE, METHOD FOR ITS PREPARATION AND METHOD FOR FINISHING THE EXTERNAL SURFACES OF GLASS CONTAINERS

[75] Inventor: Erich Ruf, Essen, Fed. Rep. of Germany

[73] Assignee: Th. Goldschmidt AG, Essen, Fed. Rep. of Germany

[21] Appl. No.: 81,487

[22] Filed: Aug. 4, 1987

[30] Foreign Application Priority Data

Aug. 27, 1986 [DE] Fed. Rep. of Germany ....... 3629147

[51] Int. Cl.$^4$ ............................................... B05D 3/02
[52] U.S. Cl. .............................. 427/389.7; 427/407.2; 427/419.2; 428/432; 428/500; 428/702; 525/333.7; 525/359.1; 524/576
[58] Field of Search ............... 427/389.7, 407.2, 419.2; 428/432, 500, 702

[56] References Cited

U.S. PATENT DOCUMENTS

| | | | |
|---|---|---|---|
| 3,161,536 | 12/1964 | Pettre et al. | 427/407.2 |
| 3,779,792 | 12/1973 | Stoy et al. | 427/407.2 |
| 3,836,386 | 9/1974 | Roy | 427/407.2 |
| 3,920,869 | 11/1975 | Eckett et al. | 427/407.2 |
| 3,944,511 | 3/1976 | Taylor | 427/407.2 |
| 4,056,208 | 11/1977 | Prejean | 427/407.2 |
| 4,332,859 | 6/1982 | Fonaki et al. | 427/407.2 |
| 4,355,059 | 10/1982 | Blackwell | 427/389.7 |

*Primary Examiner*—Joseph L. Schofer
*Assistant Examiner*—Bernard Lipman
*Attorney, Agent, or Firm*—Toren, McGeady & Associates

[57] ABSTRACT

Polyethylene with an average molecular weight of 500 to 10,000 is disclosed having one or several laterally bound group(s) of the formula

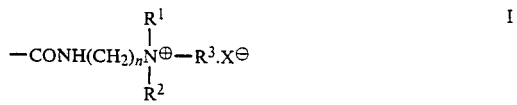

wherein $R^1$ and $R^2$ are the same or different and represent a lower alkyl group with 1 to 4 carbon atoms. $R^3$ is alkyl or aryl, X is a halogen or sulfate residue and n is 2 or 3. A method for the preparation of the modified polyethylene is also disclosed. The polethylene, preferably in the form of an aqueous dispersion, is applied to glass surfaces, especially the external surface of glass containers. The modified poyethylene is especially suitable for the so-called cold-end finishing of glass. The protective layers obtained have very good smoothness values. The protective layers are resistant to the repeated action of hot aqueous washing liquors and retain their smoothness. The glass containers, provided with the protective layers, may be labelled in the usual manner.

6 Claims, No Drawings

MODIFIED POLYETHYLENE, METHOD FOR ITS PREPARATION AND METHOD FOR FINISHING THE EXTERNAL SURFACES OF GLASS CONTAINERS

FIELD OF INVENTION

The invention is directed to polyethylene with laterally bound groups, which are derived from acid amides and have a terminal quaternary ammonium group. The invention furthermore relates to a method for preparing a polyethylene modified in this manner. Considered from another aspect, the invention is concerned with the finishing and improving of glass surfaces, especially external glass surfaces of glass containers, with the modified polyethylene.

More particularly, the invention relates to the afterfinishing of glass surfaces, which have a thin surface layer of metal oxides, for example, of tin oxides (so-called hot-end finishing), with aqueous dispersions of polyethylene, modified in accordance with the invention, (so-called cold-end finishing) to improve the smoothness of the surfaces and to increase the scratch resistance.

BACKGROUND INFORMATION AND PRIOR ART

The strength of glass depends on the intactness of the glass surface. Immediately after glass is produced, its strength is highest. However, the strength is reduced when the glass surface has nicks or scratches. Numerous methods are therefore known for protecting the surfaces of objects of glass against mechanical damage.

For example, it is known to treat glass objects immediately after they are shaped at temperatures between 370° and 750° C. with inorganic or organic compounds of titanium, tin or zirconium (the so-called hot-end finishing). With this treatment, thin, colorless, transparent, protective metal oxide layers are formed on the surfaces of the hot-finished glass objects.

To further increase the scratch hardness, the strength and especially the smoothness of glass objects, it is known that an additional protective organic layer may be applied on glass objects which are coated with metal oxides.

From the extensive patent literature, the following are cited as being illustrative of the state of the art.

In the German Pat. No. 1,291,448, a method is described to increase the scratch hardness and strength of glass objects, especially of glass bottles, by producing a thin, colorless, transparent, protective layer on the external surfaces of the glass objects. The characteristic feature of this method resides in that thin layers of a pyrolyzable inorganic salt or of a pyrolyzable organic compound of titanium, zirconium, tin or vanadium, applied on the glass objects, are decomposed pyrolytically on the glass objects at temperatures between 370° and 705° C. to the corresponding metal oxides, whereupon the glass objects are cooled to temperatures between 230° and 65.5° C. and an olefin polymer, a polyurethane, a polystyrene or an acetate salt of an alkylamine are sprayed on the still hot glass surfaces. An example of an olefin polymer is a polyethylene wax of low molecular weight, which is used in the form of an aqueous emulsion. As emulsifier, the alkali metal salt of a fatty acid, especially potassium oleate, is used. The thickness of the protective layer on the glass object is about 1 μm. These films of polyethylene wax are, however, not resistant to soap suds and, when the container is cleaned, are detached after a relatively short time by the wash-active substances of the hot cleaning liquor.

German Pat. No. 1,298,681 discloses a method for coating glass objects with a wear-resistant and slideable coating. This method is characterized in that an aqueous solution of a reaction product of polyvinyl alcohol, an emulsified polyolefin, preferably emulsified polyethylene, and an acid compound is applied to the surface of the glass object.

The German Pat. No. 1,596,742 relates to a method for preparing longlasting smooth protective layers on glass objects, for which the protective layer is applied from a mixture of a dispersed polyolefin and a polyoxyethylene derivative of a fatty acid on the glass object heated to 70° to 225° C. The disperse polyolefin preferably is polyethylene. Preferably polyoxyethylene monostearate is used as polyoxyethylene derivative of a fatty acid.

The German Pat. No. 2,432,478 discloses a glass container with a protective layer of an ionic copolymer of an α-olefin and an α,β-ethylenically unsaturated carboxylic acid, the glass container additionally having a sliding coating with the following components in parts by weight:

1 part of at least one of the following salts: calcium stearate, zinc stearate, calcium oleate, zinc oleate;

0.5 to 2 parts of a soluble polyvinyl alcohol; and 1.7 to 3.6 parts of at least one of the following oleates: potassium oleate, sodium oleate and ammonium oleate.

The coating materials described in the prior art, are, however, not able to fulfill all the requirements for a satisfactory protective layer material for glass surfaces. These protective layers must fulfill especially the following demands:

The protective layers should effectively protect the glass surface against mechanical damage, such as occurs when the glass containers rub against one another during cleaning, filling or packaging or come into frictional contact with metal surfaces of the cleaning, filling or packaging machines.

The protective layers should be able to withstand numerous cleaning and washing procedures, for example, in dishwashing machines. The protective layers must also be resistant to attack by hot, aqueous washing liquors at elevated temperatures.

The protective layers must have a good sliding capability so that the treated glass containers are readily manageable. The term "sliding capability" means that the layers act in the manner of a lubricant when contacted by another object such as another glass bottle.

The protective layers should adhere well to glass surfaces, so that, when damaged at a point or a small area, they cannot readily be pulled from the glass surface.

Labels, especially labels with a pressure-sensitive coating, must adhere adequately to the protective layers of the coating to ensure that the treated glass containers can be labelled.

The protective layers must be physiologically safe, since the majority of glass containers having such protective layers are used for packaging foods or beverages.

Finally, the protective layers should not significantly increase the ultimate price of the glassware so treated.

OBJECTS OF THE INVENTION

It is the primary object of the invention to provide a protective layer material, which superiorly meets the above-mentioned requirements. Another object is to render possible the application of the protective layer material in the form of an aqueous dispersion. Preferably, the protective layer material is applied on glass containers, which have previously been hot-finished with organometallic compounds under the formation of a metal oxide layer and still have a temperature of about 50° to 150° C. (cold-end finishing). Generally, it is an object of the invention to improve on the art of protective layers for glass surfaces.

SUMMARY OF THE INVENTION

The above objects are obtained in a superior manner by using, pursuant to this invention, a polyethylene, modified in a particular manner, which permits the formation of protective layers having the desired property profile.

Pursuant to the invention, polyethylene with an average molecular weight of 500 to 10,000 is provided with the polyethylene having one or several laterally bound group(s) of the formula

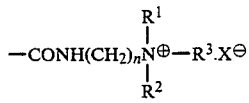

wherein $R^1$ and $R^2$ are the same or different and represent a lower alkyl group with 1 to 4 carbon atoms, $R^3$ is alkyl or aryl, X is a halogen or sulfate residue and n is 2 or 3.

Preferably, the modified polyethylene has an average molecular weight of 1,000 to 1,000. The average polymer molecule should have 1 to 10 and preferably 1 to 5 laterally bound groups of formula I.

$R^1$ and $R^2$ may be the same or different. Preferably, however, they are the same. They may be methyl, ethyl, propyl, isopropyl, butyl or isobutyl. Preferably, both $R^1$ and $R^2$ represent methyl.

$R^3$ is alkyl or aryl. The alkyl group may have 1 to 20 carbon atoms. Preferably, it is linear. The alkyl group may be substituted and may also be an aralkyl group. A preferred example of an aralkyl group is the benzyl group. As aryl group, the phenyl group is preferred.

X is a halogen or sulfate ion. Preferably, X is a chloride ion.

The subscript n is 2 or 3, preferably 3.

The polyethylene preferably has 1 to 10 laterally bound groups of formula I.

A further aspect of the invention is a method of preparing the polyethylene, modified in accordance with the invention. This method is characterized in that polyethylene with an average molecualr weight of 500 to 10,000 and with one or several laterally bound group(s) of the formula $$-CONH(CH_2)_nNR^1R^2 \qquad II$$

wherein $R^1$, $R^2$ and n are defined as above, is heated to a temperature above the melting temperature and is reacted with an amount of compound $R^3X$ sufficient to quaternize the $-NR^1R^2$ group, $R^3$ and X being as defined above.

Polyethylene with one or several laterally bound group(s) of the general Formula II may be synthesized by melting the partially or surface oxidized and optionally esterified polyethylene of the indicated molecular weight range and reacting it with at least equimolar amounts of an amine of the general formula

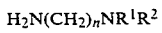

wherein $R^1$, $R^2$ and n are as defined above, at temperatures of 150° to 200° C. and with a reaction time of 1 to 8 hours. Subsequently residual reaction water in the product, or alcohol, which has been set free by splitting the ester and unreacted amine may be distilled off under reduced pressure.

For this purpose, preferably a partially or surface oxidized, optionally esterified polyethylene with an acid number of 20 to 40 and especially of 20 to 30 and a saponification number of 20 to 70 and especially of 40 to 60 is used.

A further aspect of the invention is the use of the polyethylene, modified in accordance with the invention, for finishing the external surface of glass containers.

The modified polyethylene produces on glass surfaces smooth protective layers with outstanding sliding capability. The protective layers adhere very well to glass surfaces and are therefore suitable especially for after-finishing used bottles (reusable bottles).

The protective layers are resistant to the repeated action of hot, alkaline wash liquor and retain their smoothness.

The glass containers, provided with the protective layers, can be labelled in the usual manner.

The special smoothing effect of the modified polyethylene is also demonstrated by the fact that hot-end finished glass containers, which are immersed in a polyethylene dispersion at room temperature or onto whose external surfaces the dispersion is sprayed, still show a good smoothing effect even in the wet state or after the action of water of condensation on the coated glass surface. By contrast, with other cold-end finishing agents based on unmodified polyethylene, this is the case only after such layers have commenced to dry.

The polyethylene, modified in accordance with the invention, is usually applied in the form of an aqueous dispersion on the glass surface and dried there to form the protective layer. The polyethylene dispersion generally is applied at the end of a hot-end finishing process with utilization of the residual heat of the glass container to be finished, at a glass temperature of 50° to 150° C. For this purpose, the dispersion is sprayed on the glass surface. It is also possible to immerse the glass containers in the dispersion.

Dispersants, known from the art, may be used to prepare suitable dispersions of the polyethylene, modified in accordance with the invention. Suitable dispersants are water-soluble addition products of ethylene oxide on fatty alcohols or alkylphenols.

However, those boundary surface-active compounds, which have betaine or amine oxide groups as hydrophilic groups and long-chain alkyl groups as hydrophobic groups, have proven to be particularly useful as dispersants.

An example of such a suitable betaine is a compound of the general formula

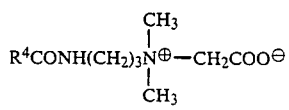

wherein $R^4$ is a long-chain alkyl group, derived from a fatty acid and having 7 to 17 carbon atoms on the average.

In a similar manner, an amine oxide of the following general formula

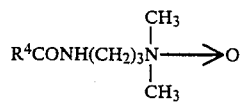

wherein $R^4$ is as defined above, is suitable as a dispersant.

Such betaines and amine oxides are known from the state of the art.

To prepare the dispersions, the polyethylene, modified in accordance with the invention, is melted and the dispersant or dispersant mixture is advantageously dissolved or dispersed uniformly in the aqueous phase. The melt of the modified polyethylene is added with intensive stirring to the water, which has been heated to 60° to 95° C. It is recommended to slowly cool the dispersion obtained with stirring. A cooling rate of about 1° to 3° C./min should advantageously be maintained.

Generally, the inventive dispersions may have the following composition (in percent by weight):

|  | Limit Values | Preferred | Particularly preferred |
| --- | --- | --- | --- |
| Modified polyethylene | 1–40 | 1–40 | 1–25 |
| Dispersant | 0.4–30 | 1–20 | 1–15 |
| Water | 98.6–30 | 98–40 | 98–60 |

For the finishing of glass surfaces, the dispersion of the modified polyethylene, obtained by the inventive method, may be used directly or, if necessary, after dilution to 0.1–0.2% by weight of polyethylene.

The dispersions, prepared in the presence of the betaines of Formula IV or the amine oxides of Formula V, are not sensitive to salts causing hardness in water.

The following example shows the preparation of the polyethylene, modified in according with the invention, in the form of an aqueous dispersion and the use of this dispersion for the cold-end finishing of glass, is being understood that the example is given by way of illustration and not by way of limitation.

Preparation of Polyethylene, With Quaternary Ammonium Groups Pursuant to the Invention and of the Aqueous Dispersion Thereof In a 2 L 4-neck flask equipped with stirrer, thermometer, distillation bridge, receiver and dropping funnel, 800 g of a polyethylene wax with a saponification number of about 40 to 60 are melted and, at a temperature of 120° C., mixed quickly with stirring with 100 g of dimethylaminopropylamine supplied from a dropping funnel.

The reaction mixture is subsequently heated with stirring for about 4 to 5 hours to about 170° C. Subsequently, under the vacuum produced by a water-jet pump and while continuing the stirring (with the product temperature at about 170° C.), the water or alcohol from the reaction and the excess amine are distilled off. About 874 g of amidopropyldimethylamino group-containing polyethylene are obtained.

The amidopropyldimethylamino group-containing polyethylene (120 g) is melted by heating to about 150° to 160° C. and, while still in liquid form, is reacted at this temperature with stirring with 20 g of benzyl chloride in a 4-neck flask, which is equipped with stirrer, dropping funnel, thermometer, distillation bridge and receiver. The reaction mixture is stirred for 1 hour at this temperature. Subsequently, the excess benzyl chloride is distilled off under vacuum (2 mbar). A total of 131 g of polyethylene containing quaternary ammonium groups is obtained.

With the help of a heatable dropping funnel, 78.5 g of the still liquid, polyethylene containing quaternary ammonium groups is stirred into a mixture having a temperature of 95° to 98° C. The mixture is in an emulsifying vessel (1 L glass flask, equipped with stirrer, thermometer, reflux condenser and heatable dropping funnel) which contains 361.2 g of water and 60.0 g of a 30% aqueous solution of coconut fatty acid amidopropyldimethylamine oxide. The dispersion, so obtained, is stirred for a further 30 minutes at 98° C. and subsequently cooled with stirring to room temperature and used for the following comparison experiment.

For carrying out the comparison experiments, wet beer bottles, which have been subjected to a hot-end finishing of 50 ctu (coating thickness unit) and which are at room temperature, are used.

The following polyethylene dispersion of the state of the art is used for the comparison. Partially or surface oxidized polyethylene with a saponification number of 40 to 50 is melted with a nonionic emulsifier and dispersed with hot water. The dispersion contains 24% solids.

The inventive dispersions and the comparison dispersion are diluted with deionized water in the ratio of 1:50. The beer bottles, which are at room temperature, are completely immersed in this dispersion and pulled out again immediately. After that, scratch-test values are determined with the help of a scratch resistance tester (a) without further treatment
(b) after rinsing with water.

The following values are measured:
Dispersion with unmodified polyethylene:
  (a) without further treatment: 1 to 2 kg
  (b) after rinsing with water: 1 kg
Dispersion with polyethylene modified pursuant to the invention:
  (a) without further treatment: >25 kg
  (b) after rinsing with water: 20 kg These experiments, carried out under conditions simulating practical conditions, show that polyethylene, modified in accordance with the invention, makes wet finishing of glass bottles possible and that the finished glass surface withstands a 25-fold higher load without the formation of scratches or other surface defects.

I claim:

1. A method of finishing the surface of a glass object, which comprises applying to the surface an effective amount of polyethylene with an average molecular weight of 500 to 10,000 and having at least one laterally bound group of the formula

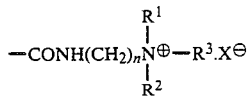

wherein $R^1$ and $R^2$ are the same or different and represent a lower alkyl group with 1 to 4 carbon atoms, $R^3$ is alkyl or aryl, X is a halogen or sulfate residue and n is 2 or 3, and drying the surface.

2. The method of claim 1, wherein the glass surface to which the polyethylene is applied has a metal oxide coating.

3. The method of claim 2, wherein the glass object to which the polyethylene is applied has a temperature of 50°–150° C.

4. The method of claim 1, wherein the polyethylene is applied in the form of an aqueous dispersion.

5. A glass object having a surface coating, wherein the object is the product of the method of claim 1 coating comprises the polyethylene of claim 1.

6. The glass object of claim 5, wherein the glass object has a metal oxide layer interposed between the surface coating and the glass surface.

* * * * *